(12) United States Patent
Boyer et al.

(10) Patent No.: US 6,739,128 B2
(45) Date of Patent: May 25, 2004

(54) ELECTRONICALLY CONTROLLED DAMPENER FOR HYDROSTATIC TRANSMISSION

(75) Inventors: Scott G. Boyer, Borden, IN (US); Kevin L. Johnson, Douglas, GA (US)

(73) Assignee: Tecumseh Products Company, Tecumseh, MI (US)

( * ) Notice: Subject to any disclaimer, the term of this patent is extended or adjusted under 35 U.S.C. 154(b) by 23 days.

(21) Appl. No.: 10/133,335

(22) Filed: Apr. 25, 2002

(65) Prior Publication Data

US 2002/0174651 A1 Nov. 28, 2002

Related U.S. Application Data

(60) Provisional application No. 60/293,363, filed on May 24, 2001.

(51) Int. Cl.⁷ ............................................. F16D 31/00
(52) U.S. Cl. ................................... 60/468; 60/489
(58) Field of Search ........................ 60/468, 487, 489

(56) References Cited

U.S. PATENT DOCUMENTS

| | | | |
|---|---|---|---|
| 3,132,486 A | * 5/1964 | Jonkers et al. | ............. 60/468 |
| 4,324,098 A | 4/1982 | Aruga et al. | ............. 60/420 |
| 4,628,690 A | 12/1986 | Arai et al. | ............. 60/464 |
| 4,968,227 A | 11/1990 | Szulczewski et al. | ....... 417/440 |
| 5,235,810 A | * 8/1993 | Havens | ............. 60/468 |
| 5,809,781 A | 9/1998 | Krantz | ............. 60/489 |
| 5,901,536 A | 5/1999 | Kallevig | ............. 56/10.9 |
| 6,089,005 A | 7/2000 | Kallevig | ............. 56/10.9 |
| 6,109,032 A | 8/2000 | Shimizu et al. | ............. 60/468 |
| 6,145,312 A | 11/2000 | Hauser et al. | ............. 60/464 |
| 6,332,317 B1 | 12/2001 | Hauser et al. | ............. 60/464 |
| 6,343,471 B1 | * 2/2002 | Thoma et al. | ............. 60/487 |
| 6,571,554 B2 | * 6/2003 | Johnson | ............. 60/468 |

* cited by examiner

*Primary Examiner*—Thomas E. Lazo
(74) *Attorney, Agent, or Firm*—Baker & Daniels (57) ABSTRACT

A hydrostatic transmission including a fluid motor and a variable displacement fluid pump in fluid communication with the motor and having a first and a second, greater, fluid displacement rate. The pump is mounted on a block having an outer surface, a passage through which fluid flows from the pump to the motor, and a first and a second fluid bleed hole extending from the passage to the outer surface. The passage and a sump external to the pump are in fluid communication through the bleed holes and the void of a sliding element disposed within a bore in the block when the pump is operating at its first rate and the sliding element is in a first position. The first bleed hole and the sump are substantially out of fluid communication when the pump is operating at its second rate and the sliding element is in a second position.

17 Claims, 9 Drawing Sheets

ELECTRONICALLY CONTROLLED DAMPENER FOR HYDROSTATIC TRANSMISSION

CROSS-REFERENCE TO RELATED APPLICATION

This application claims the benefit under 35 U.S.C. §119 (e) of U.S. Provisional Application No. 60/293,363, filed May 24, 2001.

BACKGROUND OF THE INVENTION

1. Field of Invention

The present invention relates to hydrostatic transmissions intended primarily for use in the lawn and garden industry on tractors, riding lawnmowers, lawn and garden implements and the like.

2. Description of the Related Art

Hydrostatic transmissions transmit rotary mechanical motion, typically from an internal combustion engine, to fluid motion, typically via positive displacement pumps and motors using oil, and then back to rotary mechanical motion to rotate a drive axle in order to drive the vehicle. The hydrostatic transmission controls the output rotary mechanical motion such that varying output speeds in the forward and reverse directions are possible with a single speed input rotary mechanical motion. Such transmissions have utilized radial piston pumps and motors, axial piston pumps and motors and hybrid transmissions wherein the pump may be of one piston design, and the motor of another. The speed of the output of the transmission is typically controlled by varying the eccentricity of the pump track ring of a radial piston pump or the swash plate angle of an axial piston pump.

Hydrostatic transmissions have an inherent problem of not achieving, when placed in neutral, a condition in which the pump displacement is completely eliminated. Although the operator may shift the implement into neutral, thereby causing the hydrostatic transmission to be placed in neutral, there may still be some motion, or "creep", of the implement. During forward or reverse operation of the hydrostatic transmission, this fluid is constantly moving through the system. In neutral, ideally, the displacement of the rotating pump is zero, and no fluid flows to the motor therefrom. Thus, no motion, however slight, is imparted to the axle. Should the rotating pump still have some slight displacement in neutral, however, fluid in one side of the hydrostatic system will become or remain slightly pressurized and cause the motor to slowly rotate, thereby creating forward or reverse motion of the wheels. What would be desirable is a hydrostatic transmission which allows any fluid displaced by the pump to be vented out of the hydrostatic system when the hydrostatic transmission is placed in the neutral position, thereby eliminating creep.

Yet another problem associated with the use of hydrostatic transmissions is the "jerking" effect created when the swash plate is moved from neutral to forward or reverse and vice versa. Dampening of the engagement or disengagement of the hydrostatic transmission would eliminate the jerking or at least "soften" the transition to and from neutral. What would be desirable is a hydrostatic transmission which includes a mechanism for dampening the response of the motor to changes in pump displacement rates as the pump approaches and leaves neutral so that such jerking would be eliminated.

SUMMARY OF THE INVENTION

The present invention provides a hydrostatic transmission including a fluid motor, a variable displacement fluid pump in fluid communication with the fluid motor, a pump mounting block having an outer surface and provided with at least one fluid passage through which fluid from the pump flows to the motor, a fluid sump external to the block, a cylindrical bore disposed within the block and having at least two apertures located diametrically opposite each other, and a sliding element disposed within the cylindrical bore. The pump has a first fluid displacement rate and a second fluid displacement rate, which is much greater than the first displacement rate. The pump mounting block has at least one first fluid bleed hole extending from the fluid passage to one of the apertures in the cylindrical bore and at least one second fluid bleed hole extending from the other of the apertures in the bore to the outer surface of the block. The sliding element is provided with at least one void and has a first position in which the void is in fluid communication with the fluid passage through the first fluid bleed hole and the void is in fluid communication with the sump through the second fluid bleed hole, and a second position in which the void is substantially out of fluid communication with the fluid passage and the sump. The fluid passage and the sump are in fluid communication through the first bleed hole, the void, and the second fluid bleed hole when the pump is operating at its the first displacement rate and the sliding element is in its first position, and the fluid passage and the sump are substantially out of fluid communication when the pump is operating at its second displacement rate and the sliding element is in its said second position.

The present invention further provides a hydrostatic transmission including a fluid motor, a variable displacement fluid pump in fluid communication with the fluid motor and having a first fluid displacement rate and a second fluid displacement rate, which is much greater than the first displacement rate, a pump mounting block having a flat surface against which the pump is slidably engaged when the pump is operating at its first and second fluid displacement rates, a fluid sump external to the block, and means for placing the passage and the sump in fluid communication when the pump is operating at its first fluid displacement rate and providing a gradual motor response to changes between the pump first and second fluid displacement rates. The means for placing the passage and the sump in fluid communication further includes means for maintaining the passage and the sump substantially out of fluid communication when the pump is operating at its second displacement rate. The block is provided with at least one fluid passage which opens to the flat block surface, fluid which flows from the pump to the motor flowing through the passage.

The present invention also provides a method for dampening the response of a fluid motor to changes in a fluid pump between a neutral position and a drive position in a hydrostatic transmission, and preventing fluid from being pumped by the fluid pump to the motor in the pump neutral position, including rotating the pump while maintaining its sliding engagement against a block having at least one passage therethrough, operating the rotating pump at a first displacement rate in its neutral position gradually decreasing the fluid communication between the passage and the sump while changing from the pump neutral position to the pump drive position, operating the rotating pump at a second displacement rate greater than the first displacement rate when in its drive position, through the passage for driving the motor, and gradually increasing the fluid communication between the passage and the sump while changing the pump from its drive position to its neutral position. In the pump neutral position, the passage and a sump are in fluid communication, whereby fluid displaced by the pump in its neutral position is directed to the sump. In the pump drive position, the passage and the sump are substantially out of fluid communication, whereby fluid displaced by the pump in its drive position is directed to the motor.

An advantage provided by the present invention is that any fluid displaced by the pump in neutral is vented out of the hydrostatic system, thereby preventing the occurrence of creep in the forward or reverse direction.

An additional advantage provided by the present invention is that it dampens the effect of changes in pump displacement to and from zero displacement by allowing a portion of the hydrostatic fluid to bleed or be vented out of the hydrostatic system as the transmission is shifted from neutral to an operative condition in forward or reverse, and vice versa.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate particular embodiments of the invention such exemplifications are not to be construed as limiting the scope of the invention in any manner.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
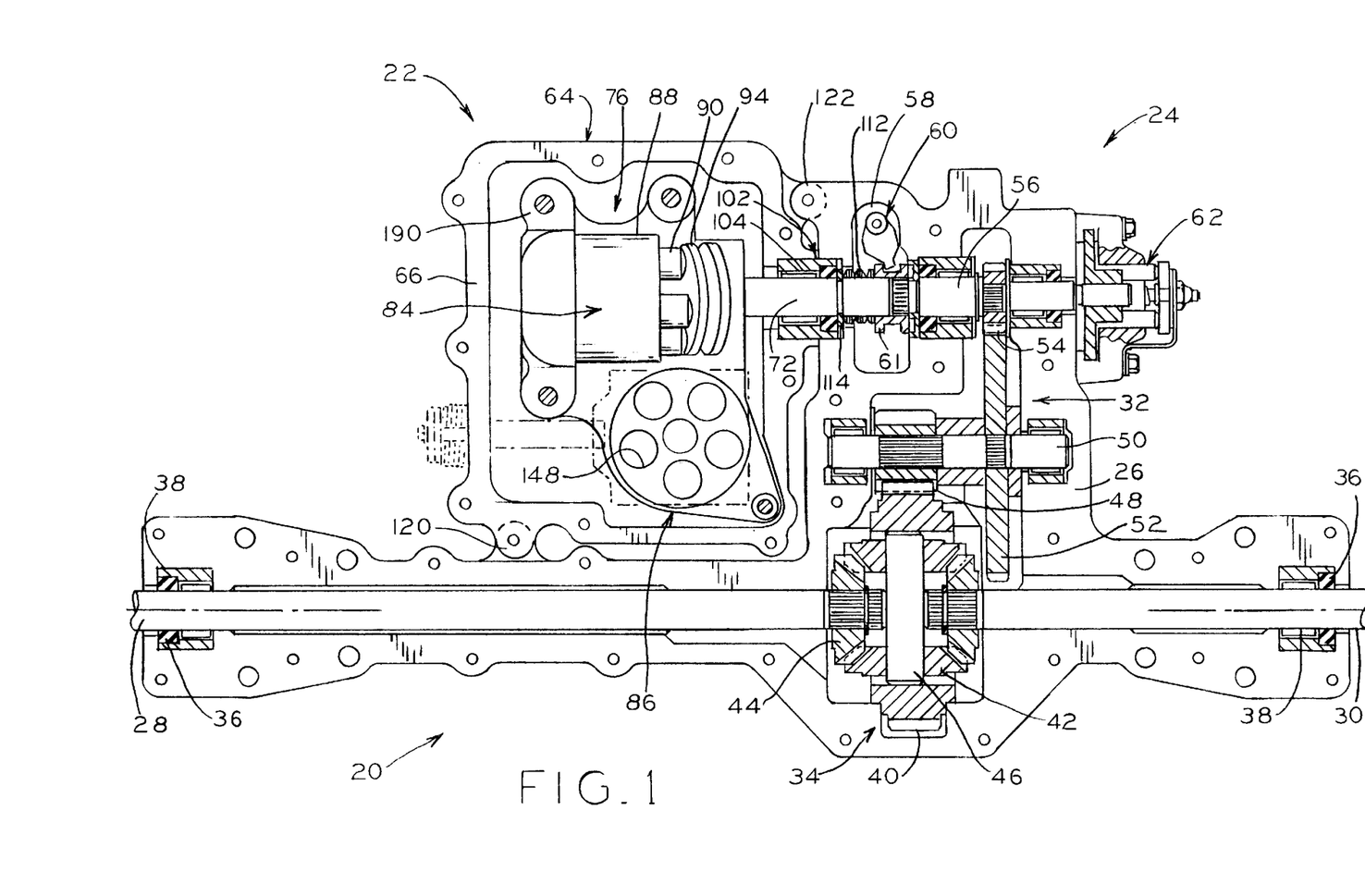
FIG. 1 is a sectional top view of a reversible hydrostatic transmission module, according to the present invention, attached to one embodiment of a differential axle unit, the assembly forming a hydrostatic transaxle.
Figure 2:
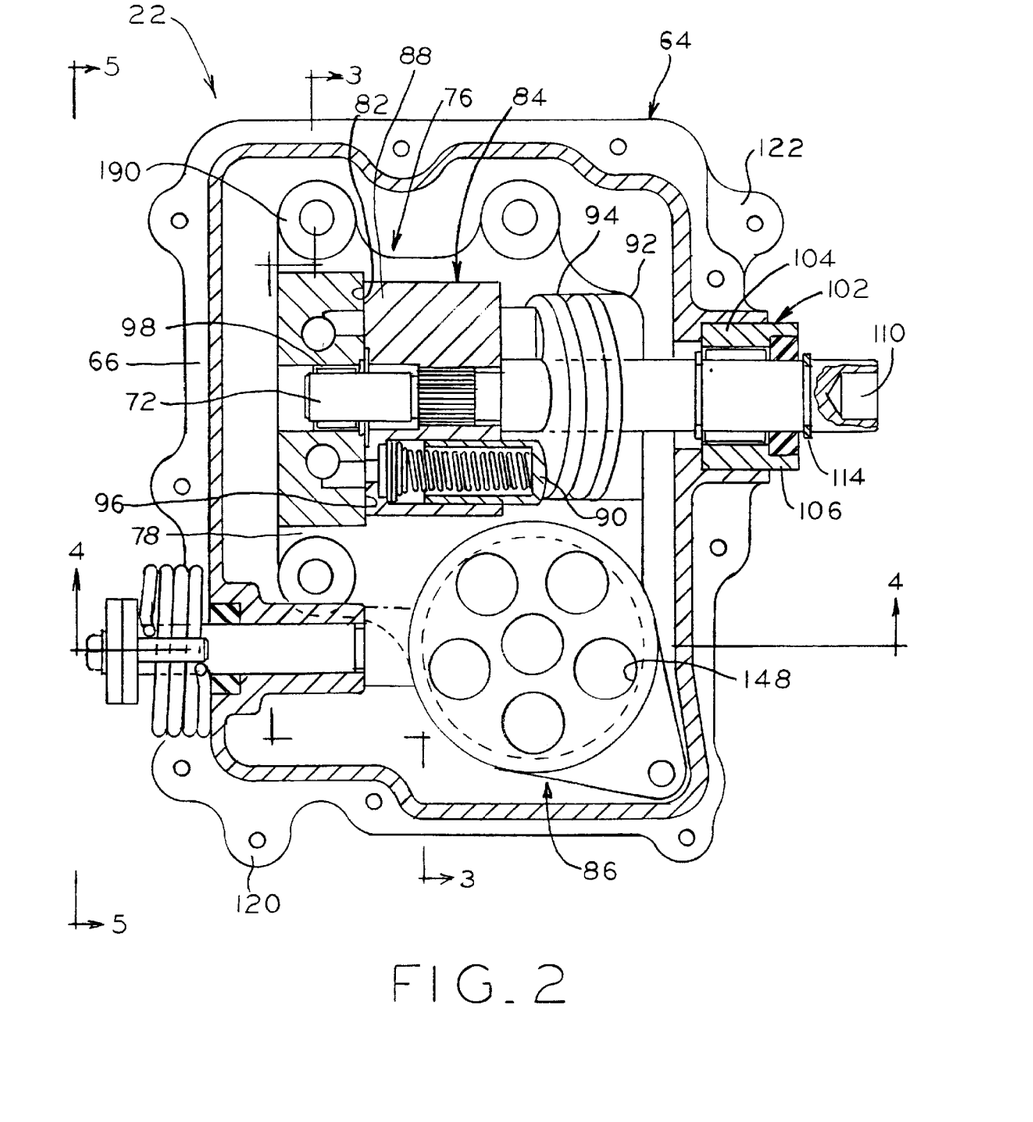
FIG. 2 is a sectional top view of the hydrostatic transmission module of FIG. 1.

Referring first to FIG. 1, transaxle 20 comprises hydrostatic transmission module 22 and axle assembly 24. Axle assembly 24 includes casing 26 having upper and lower halves, split along a horizontal plane coincident with the axes of axles 28 and 30. Disposed within casing 26 are reduction gear train 32 and differential mechanism 34. Axles 28 and 30 extend outwardly from differential mechanism 34 through a pair of openings in either end of casing 26 at which point axles 28 and 30 are sealed by seals 36 and supported by bearings 38.

Differential mechanism 34 is of a type known in the art and includes ring gear 40, bevel gears 42 and 44, and pin 46. Differential 34 is connected to pinion 48 which is splined to countershaft 50. The opposite end of countershaft 50 is similarly splined to gear 52 which is enmeshed with pinion gear 54 splined to gear train input shaft 56.

Further included in casing 26 is space 58 which contains mechanical disconnect mechanism 60 of the type disclosed in U.S. Pat. No. 5,701,738, issued Dec. 30, 1997, and assigned to the assignee of the present application. The disclosure of this patent is expressly incorporated herein by reference. Additionally, transaxle 20 includes brake mechanism 62. The operation of the brake itself is the subject of U.S. Pat. No. 6,123,182, issued Sep. 26, 2000, and assigned to the assignee of the present application. The disclosure of this patent is expressly incorporated herein by reference. Transaxle 20 is further connected to hydrostatic transmission module 22, as described hereinbelow.

Figure 6:
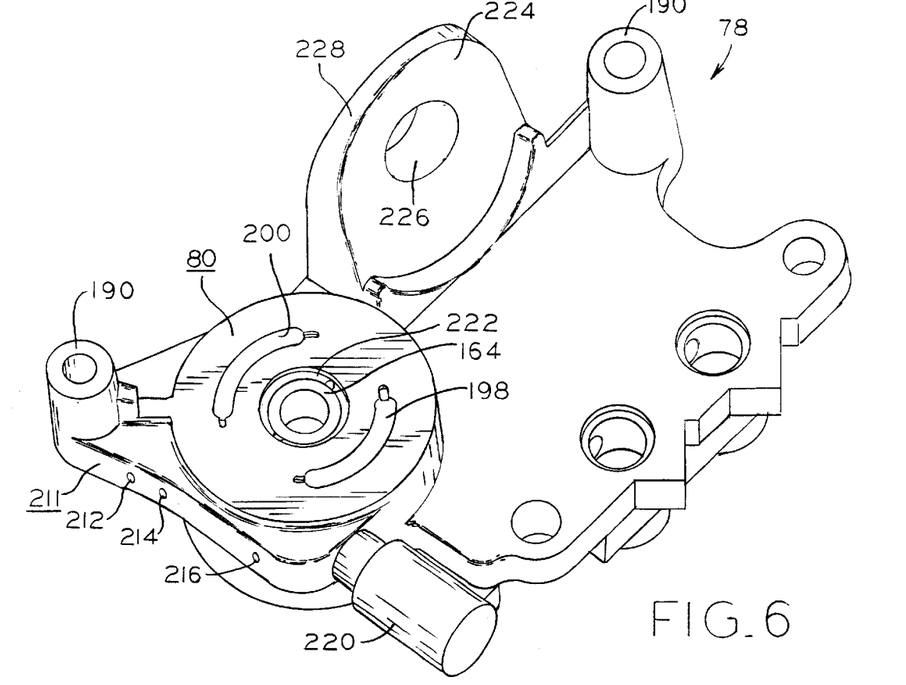
FIG. 6 is an upper perspective view of the center section or block, showing the inventive hydrostatic dampening and neutral bleed mechanism.
Figure 7:
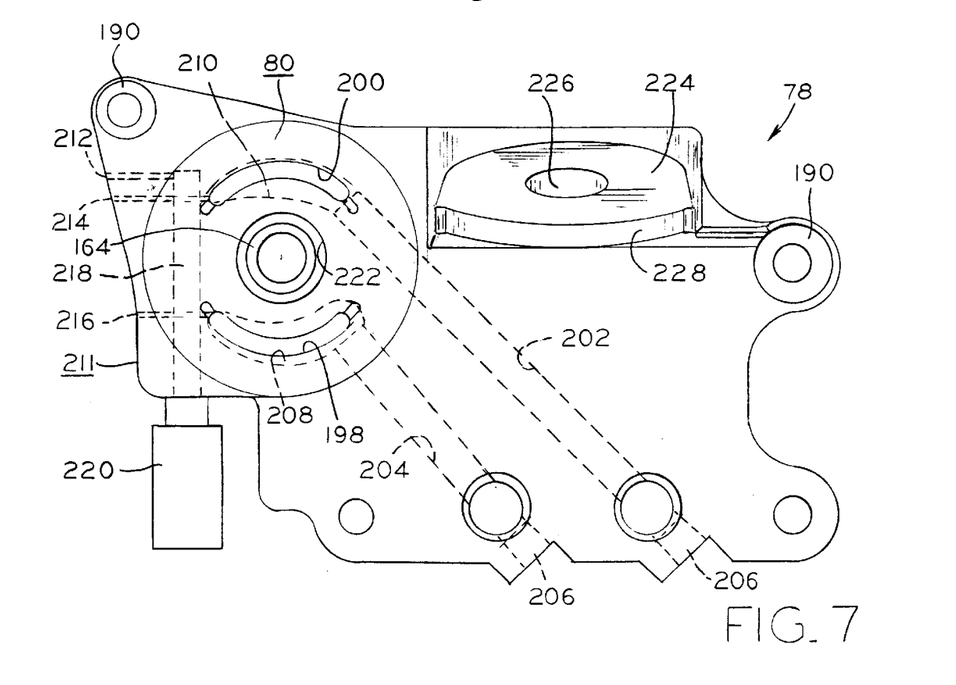
FIG. 7 is a top view of the center section or block for the hydrostatic transmission module of FIG. 6, and the inventive hydrostatic dampening and neutral bleed mechanism.

Referring now to FIGS. 2 through 5, hydrostatic transmission module 22 comprises a separate, self-contained casing 64 having two casing halves 66 and 68 split along horizontal interface 70 which is coplanar with the axis of motor output shaft 72. Casing halves 66 and 68 are connected together by a plurality of bolts 74 extending through lower casing half 68 and threadedly received in bores provided in upper casing half 66. Disposed within casing 64 is hydrostatic pump and motor mechanism 76 comprising center section, or block, 78 having pump mounting surface 80 and motor mounting surface 82 and internal passages 202 and 204 (FIG. 7) hydraulically connecting each of arcuate slots 198 and 200 (FIG. 6) in pump mounting surface 80 and motor mounting face 82. Pump and motor mechanism 76 further includes axial piston motor 84 and variable displacement pump 86.

Figure 4:
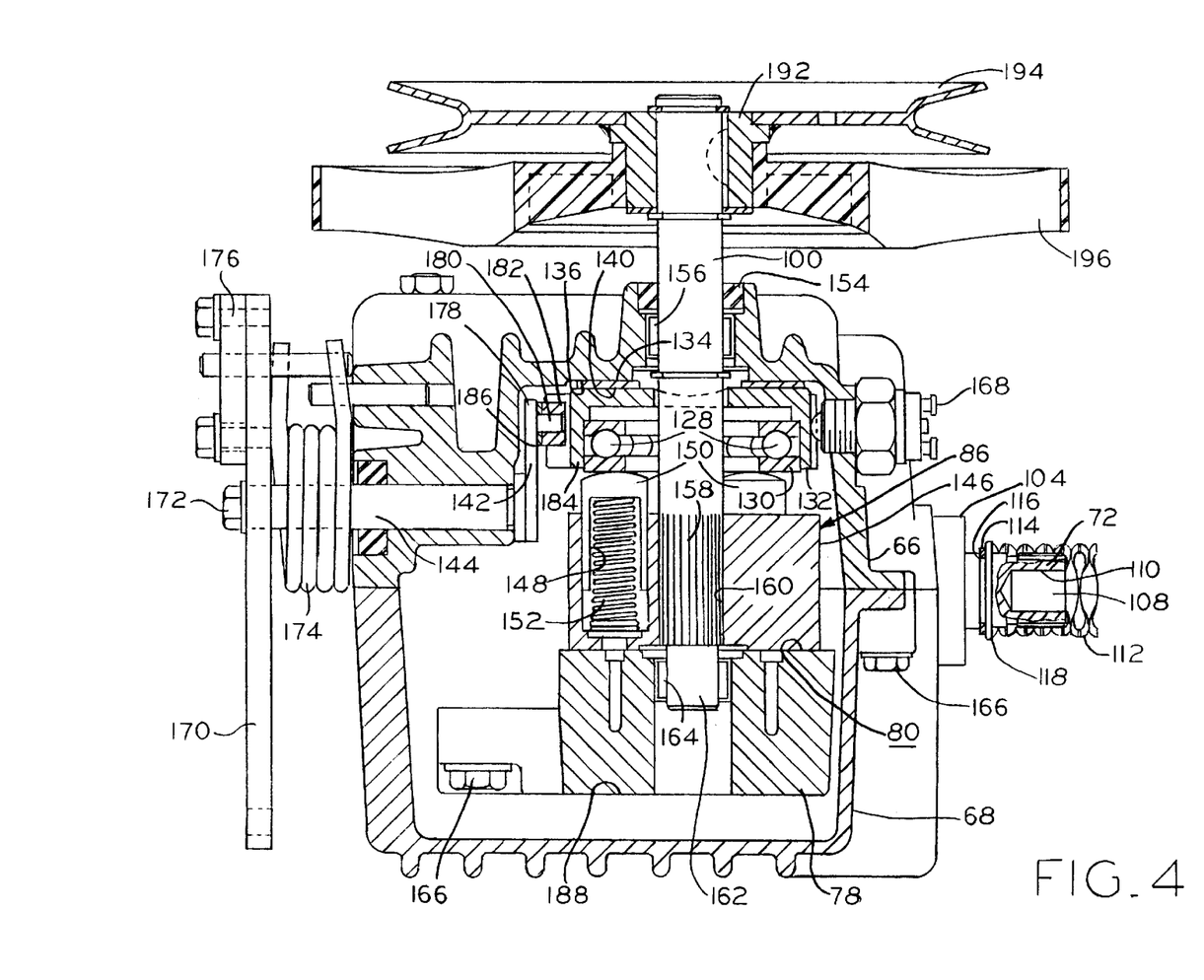
FIG. 4 is a sectional side view of the hydrostatic transmission module of FIG. 2 along line 4—4 thereof.

Axial piston motor 84 comprises rotatable cylinder 88 having a plurality of pistons 90 therein sliding against fixed swash plate assembly 92 and thrust bearing 94. Face 96 of rotatable cylinder 88 interfaces with motor mounting face 82 of center section 78. Motor output shaft 72 extends through cylinder 88 and is supported by bearings 98 in center section 78. The axis of output shaft 72 is oriented 90° relative to the axis of pump input shaft 100, as shown in FIG. 4. Motor output shaft 72 is also supported by sleeve and bearing assembly 102, particularly sleeve 104, press fitted to casing 64 and extending through portion 106 into a recess in axle casing 26.

Connection of transmission module 22 with gear train 32 occurs through reduced end 108 of gear train input shaft 56 which is received within bore 110 in the end of motor output shaft 72. A firm connection between shafts 56 and 72 occurs through collar 61 of mechanical disconnect mechanism 60 (FIG. 1) which, in its shown engaged position, rotatably couples shafts 56 and 72. In the disengaged position of collar 61, shafts 56 and 72 are not rotatably coupled. Compression spring 112 is retained on shaft 72 by ring 114, disposed in groove 116, and flat washer 118. Collar 61 is biased into its engaged position by spring 112. Transmission casing 64 is mounted to transaxle casing 26 at two locations 120 and 122 by corresponding overlapping extensions on casings 64 and 26 and bolts (not shown) which are driven from the bottom.

Figure 3:
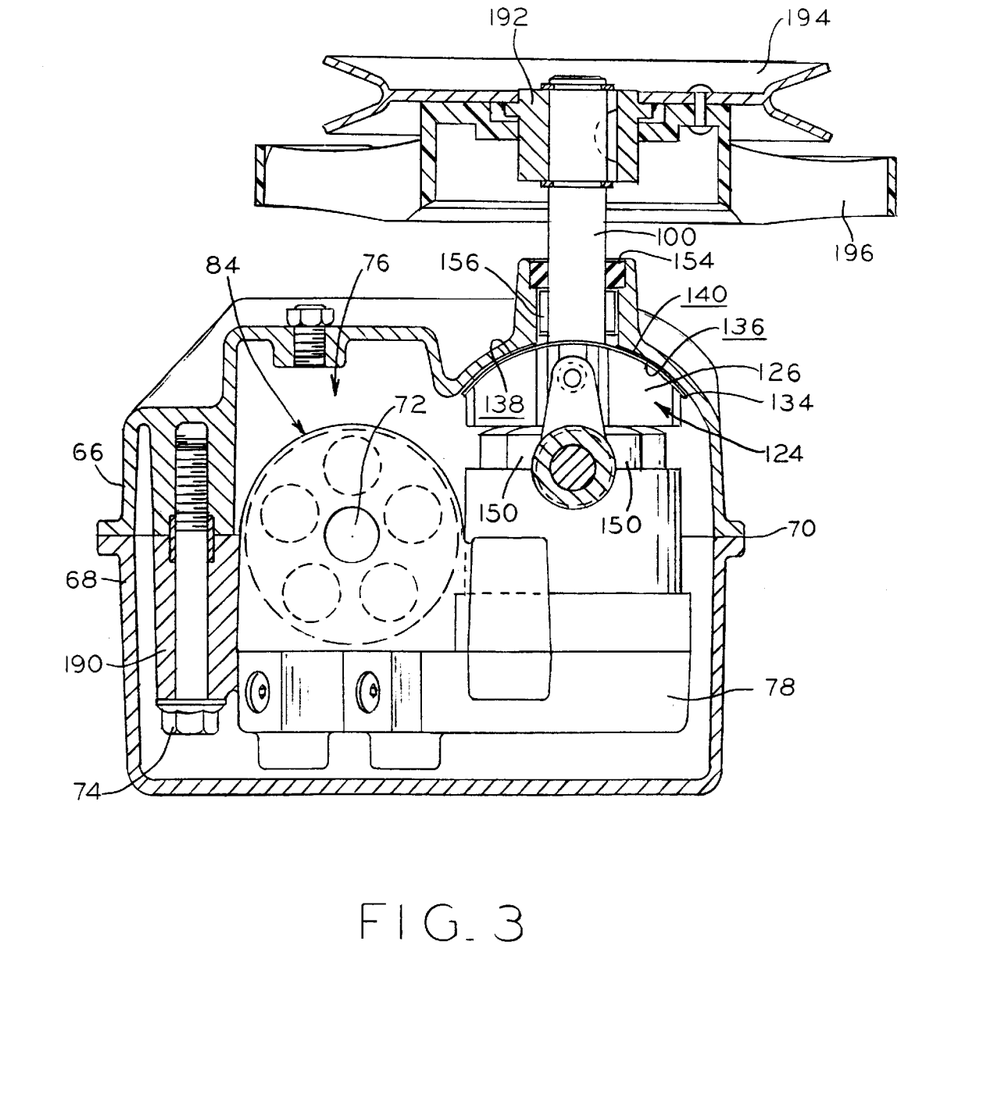
FIG. 3 is a sectional side view of the hydrostatic transmission module of FIG. 2 along line 3—3 thereof.

With reference to FIGS. 3 and 4, pump 86 is in mechanical communication with pivoting pump swash plate assembly 124, particularly swash plate 126. Swash plate assembly 124 includes swash plate 126, bearings 128, and bearing housing plates 130 and 132 encasing bearings 128. Swash plate 126 further includes arcuate bearing strips 134 with inner surfaces 136 attached to arcuate swash plate upper surface 138 and outer surface 140 interfacing with upper casing half 66. Pump swash plate assembly 124 will be variably tilted through the action of control rod 144 and control arm 142 in order to vary the displacement of pump 86. The operation of transmission module 22 is more fully described hereinbelow.

Pump 86 includes pump cylinder 146 rotatably driven by input shaft 100 and having a plurality of cylinders 148 within which are disposed pistons 150. Pistons 150 are urged against the face of swash plate 126 by springs 152. Shaft 100 is sealed by seal 154 and is rotatably supported by bearing 156. Note that pump shaft 100 extends through swash plate assembly 124 and is splined to pump cylinder 146 via splined portion 158 on shaft 100 and splined portion 160 on pump cylinder 146. Distal end 162 of shaft 100 is supported by bearing 164 in center section 78. Screws 166 connect center section 78 to upper casing half 66. Also located on upper casing half 66 is neutral switch 168. The operation of the neutral switch itself is the subject of U.S. patent application Ser. No. 09/671,796, filed Sep. 27, 2000, and assigned to the assignee of the present application. The complete disclosure of this application is expressly incorporated herein by reference.

Figure 5:
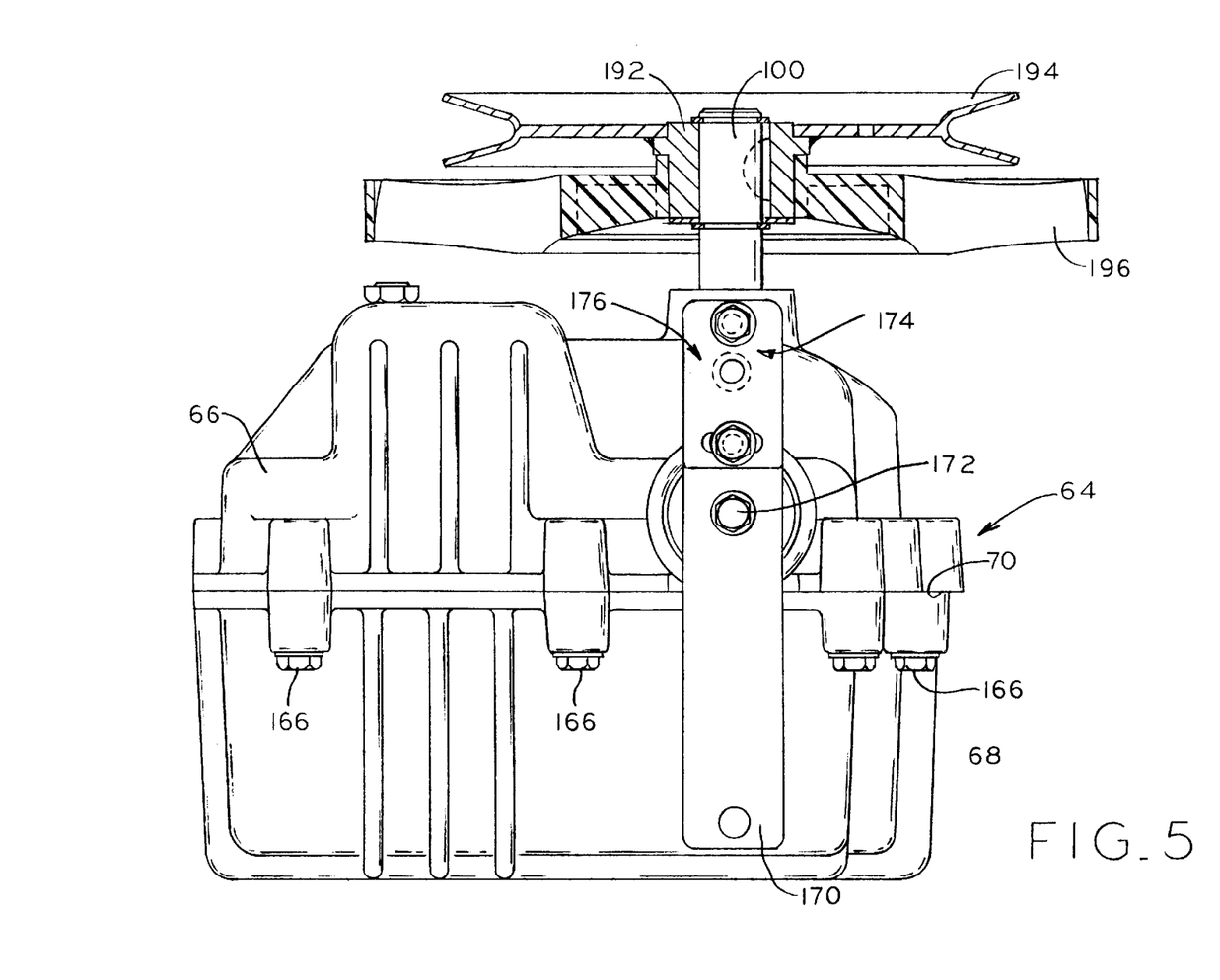
FIG. 5 is a side view of the hydrostatic transmission module of FIG. 2 along line 5—5 thereof.

Referring now to FIGS. 4 and 5, shift lever 170 is attached to rotatable control arm 142 by screw 172, external of casing 26 and received in control rod 144. Shift lever 170 is returned to neutral by a conventional return-to-neutral spring mechanism 174, while adjustable plate 176 permits fine adjustment of neutral position. Control arm 142 is attached to control rod 144 and includes end 178 which swings through an arc about control rod 144 when shift lever 170 is rotated. Pin 180 attaches to end 178 of control arm 142 and extends into slot 182 disposed on periphery 184 (FIG. 3) of swash plate 126. Friction roller 186 fits over pin 180 and freely rotates about pin 180 to engage with slot 182 of swash plate 126.

Selectively positioning control arm 142 causes swash plate 126 to variably tilt, and in turn, pistons 150, orbiting about input shaft 100, reciprocate, causing hydrostatic fluid in each cylinder 148 to pressurize as respective piston 150 retracts. Swash plate 126 tilts against a pair of low friction bearings attached to the casing, as previously described.

With reference to FIGS. 6 through 10, lower surface 188 of center section 78 is provided with a pair of openings 208 and 210 to provide makeup oil to pump 86. In addition, a filter and check valves (not shown) are provided, as is customary in the art, for controlling the ingress and quality of the make-up oil. Pump input shaft 100 is received within bore 222, having bearing 164 provided therein, and integral bosses 190 (FIGS. 1–3) of center section 78 accommodate and provide support for mounting screws 166. Plugs 206 seal blind drilled passageways 202 and 204. Provided in pump mounting surface 80 are arcuate slots 198 and 200, as described above. Extending from the exterior surface of center section 78 is the external portion 220 of the electronic control mechanism for the inventive hydrostatic dampening and neutral bleed mechanism.

Center section 78 also includes bearing cradle 224 having raised shoulder 228 (FIGS. 6 and 7) and bore 226. The structure and operation of bearing cradle 224 is disclosed in U.S. patent application Ser. No. 09/498,692, filed Feb. 7, 2000, the complete disclosure of which is expressly incorporated herein by reference.

Referring now to FIGS. 7 through 11, center section 78 includes cylindrical bore 218 in fluid communication with openings 208 and 210 through first fluid bleed holes 213 and 215. Additionally, bore 218 has two second fluid bleed holes 214 and 216 extending therefrom to exterior surface 211 of center section 78 and located diametrically opposite first fluid bleed holes 213 and 215. Likewise, vent hole 212 extends from bore 218 to exterior surface 211 of center section 78. Maintained within bore 218 is solenoid actuated piston 230, the operation of which is described hereinbelow. Piston 230 has two reduced diameter portions 234 which may move into and out of alignment with fluid bleed holes 214 and 216. Cylindrical bore 218 has conical end 219; chamber 232 is defined between conical end 219 of bore 218 and the end of piston 230. During operation of transmission module 22, motive fluid may bleed into chamber 232 as piston 230 moves. Vent hole 212 extends from chamber 232 to provide venting of the motive fluid, as described hereinbelow.

Figure 12:
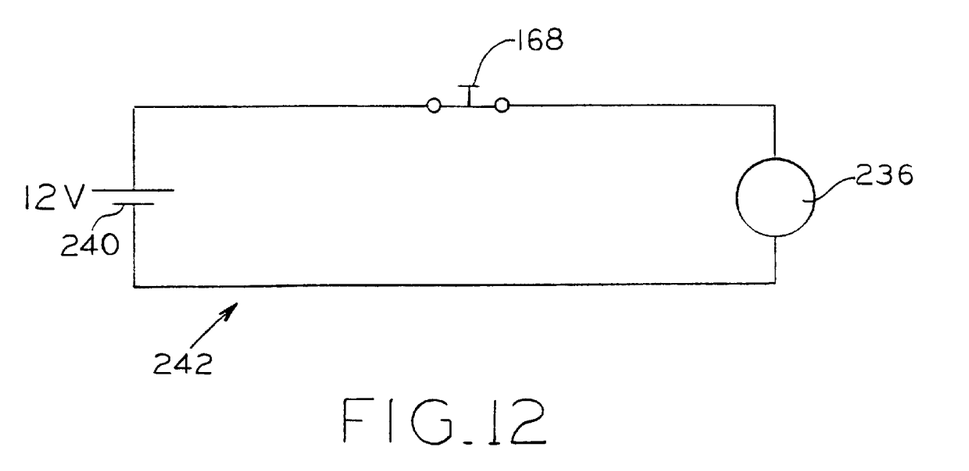
FIG. 12 is a circuit diagram for the electronic control associated with the inventive hydrostatic dampening and neutral bleed mechanism.

With reference to FIG. 12, transmission module 22 includes electronic control circuit 242 to control movement of piston 230 during transmission module 22 operation. Electronic control circuit 242 includes solenoid 236 which is used to actually move piston 230 into and out of alignment with fluid bleed holes 214 and 216 and to move piston 230 to "push" the motive fluid from chamber 232. Connected to solenoid 236 is neutral switch 168 and powering circuit 242 is battery 240, which is a 12 volt battery of a type well-known in the art.

The operation of hydrostatic pump and motor mechanism 76, through movement of swash plate 126 to effectuate variable rotational movement of motor cylinder barrel 88, will now be described with reference to FIGS. 3 through 12. Customarily, pump cylinder barrel 146 is driven by a power source through input shaft 100. Typically, input shaft 100 includes a first end keyed to common hub 192 of pulley 194 and fan 196 with pulley 194 being belt driven by a power source (not shown), thereby providing power to input shaft 100. The other end of input shaft 100 includes splined portion 158 disposed thereon engaging matching splined portion 160, formed within pump cylinder barrel 146. Swash plate 126, selectively controlled by shift lever 170, which is external to transmission casing 64, initiates motive fluid displacement within pump cylinder barrel 146 to transfer power from input shaft 100 to drive axles 28 and 30.

In operation, when an operator desires to start implement 20, neutral switch 168 is activated when transmission module 22 is placed in the neutral position. The activation of neutral switch 168 causes solenoid 236 to move reduced diameter portions 234 of piston 230 into alignment with fluid bleed hole pairs 213 and 215 and 214 and 216 such that any fluid moving in pump 86 is not directed to motor 84 to cause movement of implement 20. Any fluid moving at initial start-up would be directed to the sump, thereby allowing implement 20 to start without the load of full operation of implement 20. Once implement 20 has started and transmission module 22 is moved from the neutral position, neutral switch 168 is deactivated, thereby causing solenoid 236 to move piston 230 and reduced diameter portions 234 out of alignment with fluid bleed holes 213, 215, 214, and 216.

Once piston 230 is out of alignment with fluid bleed holes 213, 215, 214, and 216, the operation of hydrostatic transmission continues as normal wherein shift lever 170 moves in either direction causing control arm 142 to move in an opposite direction, and causing swash plate 126 to pivot in a direction corresponding to that of shift lever 170 and movement of implement 20 in a forward or reverse direction. During that operation, small amounts of fluid may build up in bore 218, and specifically bleed into chamber 232. In such cases, piston 230 moves toward the conical end of bore 218 during normal operation of transmission module 22, and "pushes" the fluid out vent hole 212. Piston 230 will move toward the conical end of bore 218 when the operator of implement 20 is moving from a reverse to a forward position.

Piston 230 and its movement provides a mechanism for dampening the change from neutral to one of the forward or reverse positions or vice versa. As piston 230 approaches the neutral position, or comes into complete alignment with fluid bleed holes 213, 215, 214, and 216, motive fluid begins to bleed from center section 78 to the oil sump; however, as piston 230 is moved away from the neutral position, motive fluid continues to bleed, albeit at a decreasing rate, as reduced diameter portions 234 move away from fluid bleed holes 213, 215, 214, and 216. In either scenario, the change from one displacement rate to another occurs gradually as the fluid slowly begins to bleed or slowly stops bleeding.

Figure 8:
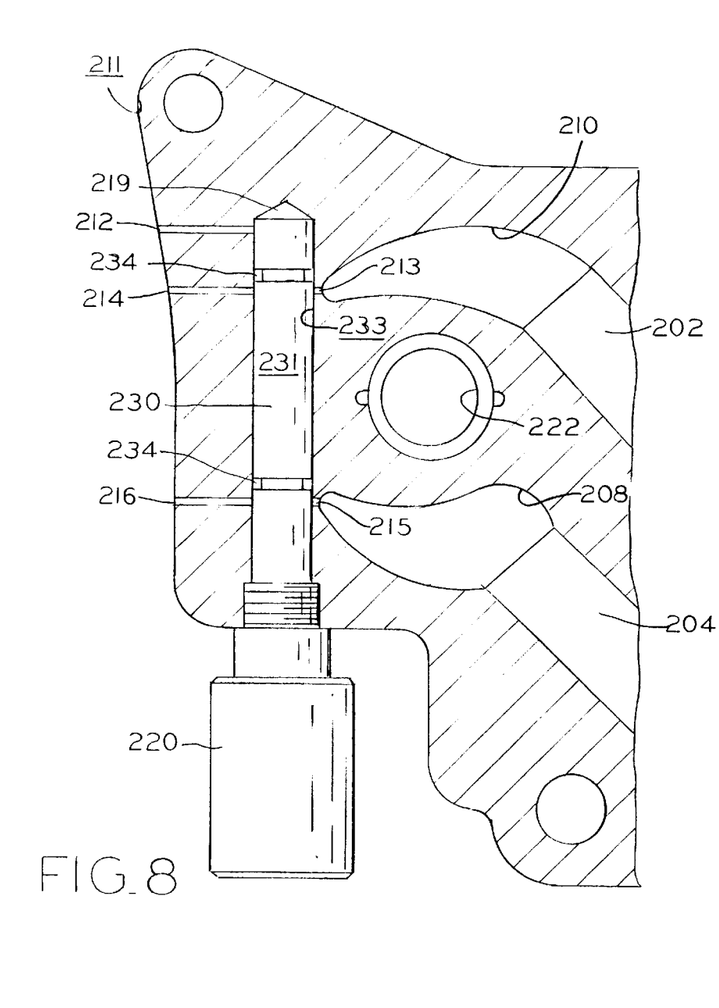
FIG. 8 is an enlarged, fragmentary view of the center section and the inventive hydrostatic dampening and neutral bleed mechanism, the mechanism being in a fully engaged position.
Figure 9:
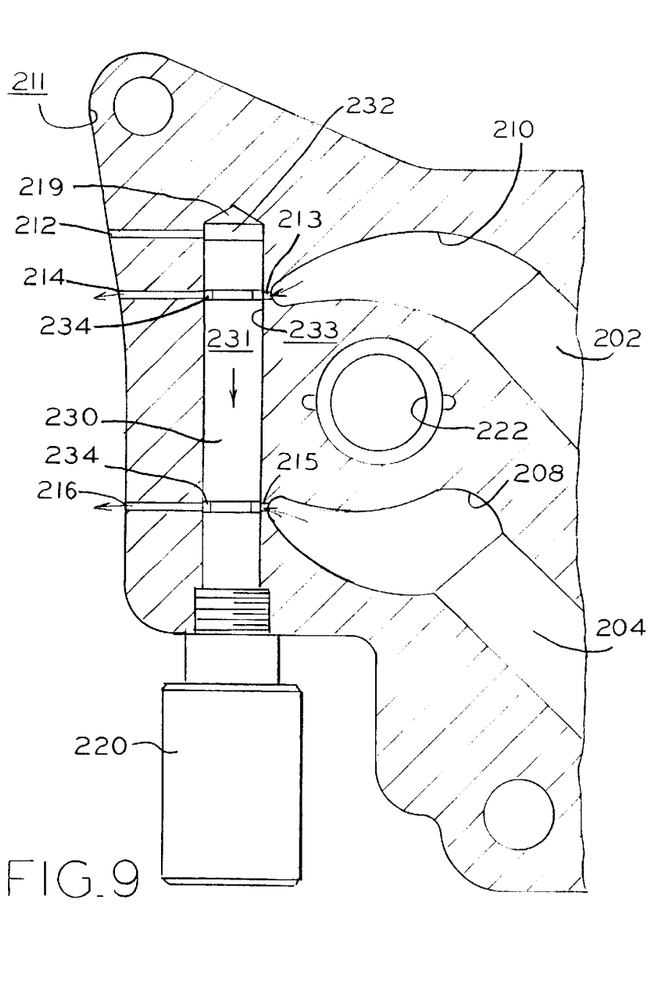
FIG. 9 is an enlarged, fragmentary view of the center section and the inventive hydrostatic dampening and neutral bleed mechanism, the mechanism being in a fully neutral position.
Figure 10:
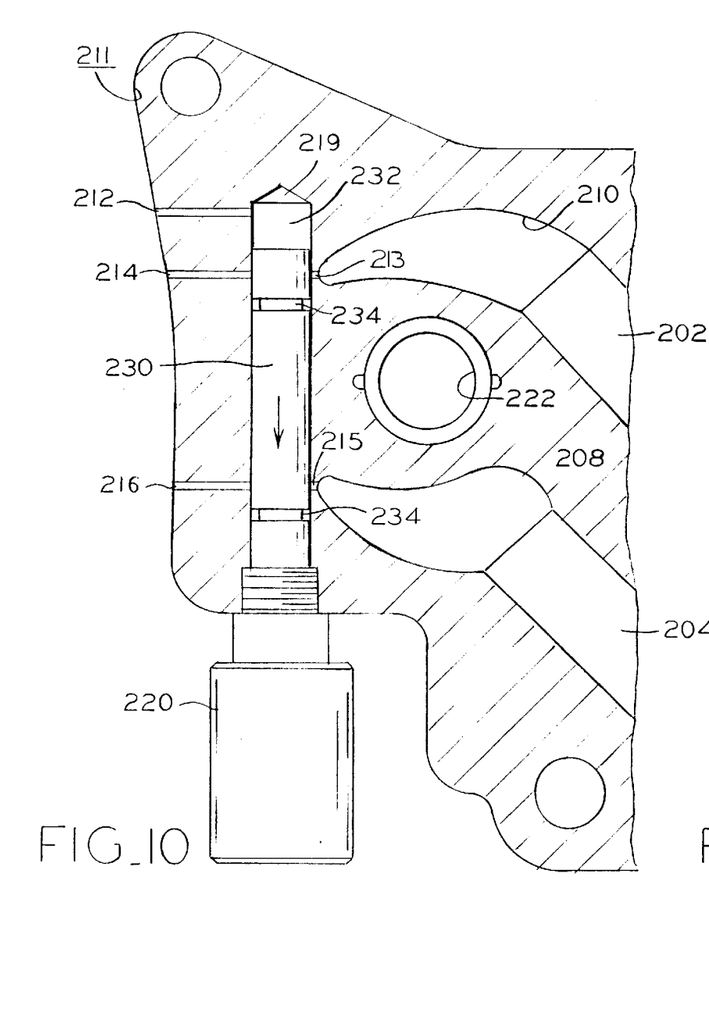
FIG. 10 is an enlarged, fragmentary view of the center section and the inventive hydrostatic dampening and neutral bleed mechanism, the mechanism being in a reverse position.
Figure 11:
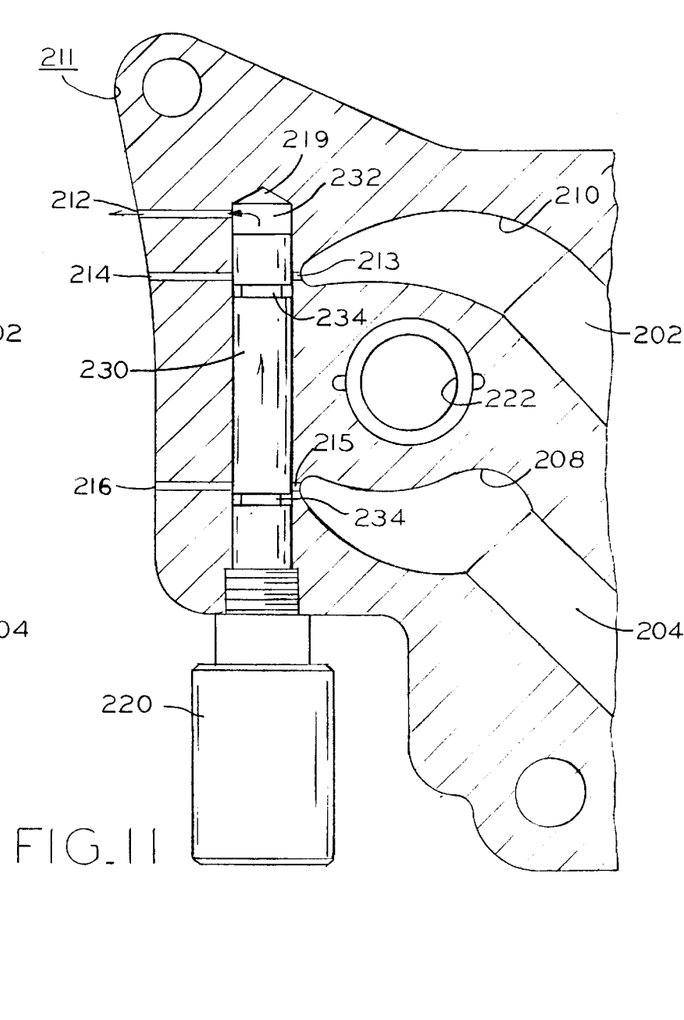
FIG. 11 is an enlarged, fragmentary view of the center section and the inventive hydrostatic dampening and neutral bleed mechanism, the mechanism approaching a fully neutral position from a reverse position, excess fluid being vented.

An example of a position where some damping is occurring is shown in FIG. 8, in which reduced portions 234 are not in complete alignment with holes 213, 215, 214, and 216, but are close enough for motive fluid to bleed, or seep, between surfaces 231 of piston 230 and surface 233 of bore 218 to holes 213, 215, 214, and 216 where it bleeds away. As piston 230 slides in bore 218, reduced portions 234 and holes 213, 215, 214, and 216 move further apart, thus slowing and eventually stopping motive fluid from bleeding from center section 78 though holes 213, 215, 214, and 216. This action occurs as piston 230 is moved in either a forward or a reverse direction (FIGS. 8, 10, and 11). The opposite of the above occurs when piston 230 approaches neutral thereby damping the change until neutral is reached and motive fluid is allowed to bleed to prevent motion of the implement.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A hydrostatic transmission comprising:
 a fluid motor;
 a variable displacement fluid pump in fluid communication with said fluid motor, said pump having first fluid displacement rate and a second fluid displacement rate, said second fluid displacement rate being much greater than said first displacement rate;
 a block on which said pump is mounted and having an outer surface, said block provided with at least one fluid passage, fluid which flows from said pump to said motor flowing through said passage;
 a fluid sump external to said block;
 a cylindrical bore disposed within said block, said bore having at least two apertures located diametrically opposite each other;
 said block having at least one first fluid bleed hole extending from said fluid passage to one of said apertures in said cylindrical bore and at least one second fluid bleed hole extending from the other of said apertures in said bore to said outer surface of said block;
 a sliding element disposed within said cylindrical bore, said sliding element provided with at least one void and having a first position in which said void is in fluid communication with said fluid passage through said first fluid bleed hole and said void is in fluid communication with said sump through said second fluid bleed hole, and a second position in which said void is substantially out of fluid communication with said fluid passage and said sump; and
 wherein said fluid passage and said sump are in fluid communication through said first bleed hole, said void, and said second fluid bleed hole when said pump is operating at its said first displacement rate and said sliding element is in its said first position, and said fluid passage and said sump are substantially out of fluid communication when said pump is operating at its said second displacement rate and said sliding element is in its said second position.

2. The hydrostatic transmission of claim 1, wherein said void is a reduced diameter portion of said sliding element.

3. The hydrostatic transmission of claim 1, wherein said pump has a neutral position and a drive position, said pump operating at its said first displacement rate when in its said neutral position, said pump operating at its said second displacement rate when in its said drive position.

4. The hydrostatic transmission of claim 3, wherein said hydrostatic transmission is reversible, said drive position is one of a forward and a reverse position, and said block is provided with two fluid passages, whereby fluid which flows from said pump to said motor flowing through one of said fluid passages when said pump is in its said forward position and through the other of said fluid passages when said pump is in its said reverse position.

5. The hydrostatic transmission of claim 1, further comprising a casing, said pump and said block being located within said casing.

6. The hydrostatic transmission of claim 5, wherein said sump is located within said casing.

7. The hydrostatic transmission of claim 5, wherein said motor is located within said casing.

8. The hydrostatic transmission of claim 7, wherein said motor is mounted to said block.

9. The hydrostatic transmission of claim 1, wherein said pump includes a swash plate assembly, said first fluid displacement rate and said second fluid displacement rate being selected through movement of said swash plate assembly, said swash plate assembly having a first position at which said pump operates at its said first displacement rate and a second position at which said pump operates at its said second displacement rate.

10. The hydrostatic transmission of claim 9, further comprising a movable control rod, said swash plate assembly operatively coupled to said control rod and being moved in response to movement of said control rod.

11. The hydrostatic transmission of claim 10, wherein said control rod movement is rotational.

12. The hydrostatic transmission of claim 1, wherein said first fluid bleed hole, said void, and said second fluid bleed hole are in complete alignment in said sliding element first position, and are completely out of alignment in said sliding element second position, said first bleed hole, said void, and said second fluid bleed hole being in partial alignment as said sliding element is moved between its said first and second positions, restricted fluid communication between said fluid passage and said sump existing during said partial alignment, whereby said fluid passage and said sump are gradually brought into and substantially out of fluid communication through said first fluid bleed hole, said void, and said second fluid bleed hole and the response of said motor to changes between said first and second pump displacement rates is dampened.

13. The hydrostatic transmission of claim 1, wherein said first fluid displacement rate is substantially zero.

14. The hydrostatic transmission of claim 1, wherein said cylindrical bore further includes a fluid vent hole proximate a closed end of said cylindrical bore and open to said sump, a portion of fluid which flows from said pump to said motor becoming trapped in said cylindrical bore and being vented through said fluid vent hole.

15. A hydrostatic transmission comprising:
a fluid motor;
a variable displacement fluid pump in fluid communication with said fluid motor, said pump having a first fluid displacement rate and a second fluid displacement rate, said second fluid displacement rate being much greater than said first displacement rate;
a block on which said pump is mounted, said block having a flat surface against which said pump is slidably engaged when said pump is operating at its said first and second fluid displacement rates, said block provided with at least one fluid passage which opens to said flat block surface, fluid which flows from said pump to said motor flowing through said passage;
a fluid sump external to said block, said block having at least one fluid bleed hole open to said fluid sump; and
means for placing said passage and said sump in fluid communication when said pump is operating at its said first fluid displacement rate and providing a gradual motor response to changes between said pump first and second fluid displacement rates, said means for placing said passage and said sump in fluid communication further including means for maintaining said passage and said sump substantially out of fluid communication when said pump is operating at its said second displacement rate.

16. The hydrostatic transmission of claim 15, wherein said pump further comprises a swash plate assembly having neutral and drive positions, said pump having its said first displacement rate in response to said swash plate assembly being in its said neutral position, said first displacement rate being almost zero, said pump having its said second displacement rate in response to said swash plate assembly being in its said drive position, said passage and said sump being placed into and substantially out of fluid communication simultaneously with movements of said swash plate assembly toward its said neutral and drive positions, respectively.

17. A method for dampening the response of a fluid motor to changes in a fluid pump between a neutral position and a drive position in a hydrostatic transmission, and preventing fluid from being pumped by the fluid pump to the motor in the pump neutral position, comprising:
rotating the pump while maintaining its sliding engagement against a block having at least one passage therethrough;
operating the rotating pump at a first displacement rate in its neutral position, in which the passage and a sump are in fluid communication, whereby fluid displaced by the pump in its neutral position is directed to the sump;
progressively decreasing the fluid communication between the passage and the sump while changing from the pump neutral position to the pump drive position by sliding an axially slidable member engaged with the block and having a void provided therein to a position in which the void is substantially out of fluid communication with the passage;
operating the rotating pump at a second displacement rate greater than the first displacement rate when in its drive position, in which the passage and the sump are substantially out of fluid communication, whereby fluid displaced by the pump in its drive position is directed to the motor through the passage for driving the motor; and
progressively increasing the fluid communication between the passage and the sump while changing the pump from its drive position to its neutral position by sliding the axially slidable member to a position in which the void is in fluid communication with the passage.

* * * * *